United States Patent
Ellertson et al.

[11] Patent Number: 6,073,716
[45] Date of Patent: Jun. 13, 2000

[54] HYDRAULIC SYSTEM FOR VEHICULAR TRACTION DRIVE

[75] Inventors: Gary A. Ellertson, Kenosha; Kellen J. Chicoine, Racine, both of Wis.

[73] Assignee: Textron Inc., Providence, R.I.

[21] Appl. No.: 09/050,163

[22] Filed: Mar. 30, 1998

[51] Int. Cl.[7] .................................................. B60K 27/02
[52] U.S. Cl. .......................................... 180/197; 180/367
[58] Field of Search ................................... 180/367, 308, 180/242, 197, 368, 364, 243, 248

[56] References Cited

U.S. PATENT DOCUMENTS

| | | | |
|---|---|---|---|
| 3,195,669 | 7/1965 | Court | 180/66 |
| 4,402,377 | 9/1983 | Brooks et al. | 180/197 |
| 5,158,150 | 10/1992 | Askeland et al. | 180/305 |
| 5,199,525 | 4/1993 | Schueler | 180/242 |
| 5,533,325 | 7/1996 | Sallstrom | 56/7 |
| 5,720,360 | 2/1998 | Clark et al. | 180/305 |
| 5,848,664 | 12/1998 | Kaspar | 180/308 |

OTHER PUBLICATIONS

Vonberg Valve, Inc. (One Page Spec. Sheet).

*Primary Examiner*—Kevin Hurley
*Assistant Examiner*—Kevin McKinley
*Attorney, Agent, or Firm*—Arthur J. Hansmann

[57] ABSTRACT

A method and system for a hydraulic drive for a vehicle wherein when one of the vehicle traction wheels is in a frictionless spin mode, then the hydraulic pressure is subjected to the action of the fuse which directs the pressure or increase in hydraulic flow to the remaining wheel or wheels for traction drive. The system can be used in either the forward or reverse drive mode.

2 Claims, 2 Drawing Sheets

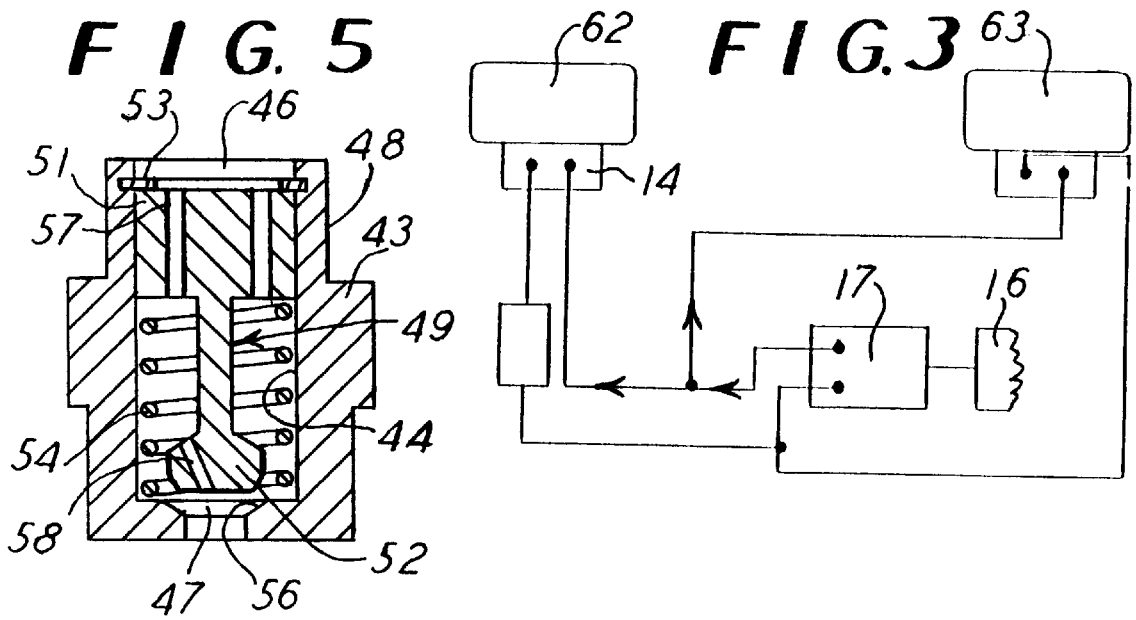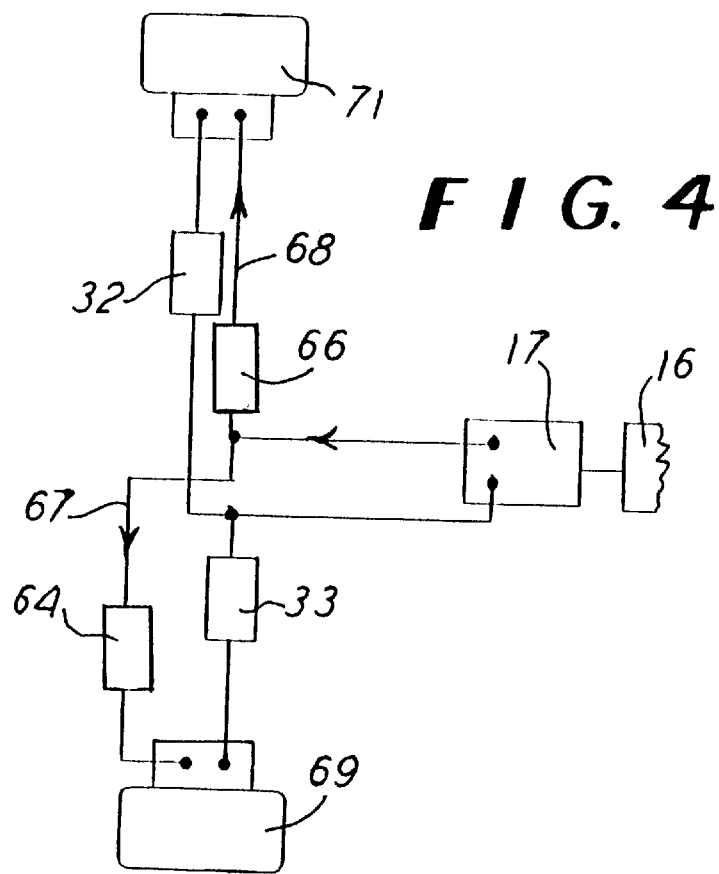

HYDRAULIC SYSTEM FOR VEHICULAR TRACTION DRIVE

This invention relates to a hydraulic system for vehicular traction drive, and, more particularly, it relates to a hydraulic system wherein when one traction wheel of the vehicle encounters a loss of traction and thus tends to spin, the system automatically senses the condition and diverts the hydraulic drive to the remaining traction wheel or wheels.

BACKGROUND OF THE INVENTION

Various hydraulic systems and methods for traction drive of tractors or the like are already known in the art. These commonly include the hydraulic components of pumps, motors, and valves, all of which are directed at powering the drive or traction wheels of the vehicle. However, the known prior art systems are relatively complex and thereby require relatively elaborate valving or the like in order to achieve the results achieved by this invention.

Accordingly, this invention provides a hydraulic system for traction drive wherein the system is simplified and reliable in performing the function of diverting the hydraulic power from one spinning wheel to another wheel which is then capable of moving the vehicle. Subsequently, when the vehicle has been moved, then the previous spinning wheel automatically receives the required hydraulic pressure for again regaining its drive and the mobilization of the vehicle.

The present invention provides for a simplified and ready hydraulic line and fuse connection for installation on a hydraulically driven tractor or the like, and the tractor may be a three-wheel or four-wheel arrangement.

This invention provides for a fluid-flow valve which is arranged to serve as a fuse in the hydraulic drive system for the traction of a vehicle. Further, the arrangement is such that the fuse can be readily inserted into a hydraulic system for assuring that the vehicle will always have traction of at least a wheel which is not subject to tractionless spinning.

Still further, the system of this invention can be applied to either or simultaneously to both the forward and reverse drives of the vehicle.

BRIEF DESCRIPTION OF THE DRAWINGS

FIG. 3 is a diagrammatic view of the system of this invention as applied to a vehicle having two drive wheels only on one side thereof.

FIG. 4 is a diagrammatic view of the system of this invention having a four-wheel vehicle but a two-drive wheel arrangement in side-by-side relationship and showing a fuse installed for both forward and reverse drives.

FIG. 5 is a longitudinal sectional view of the fuse utilized in this invention.

DETAILED DESCRIPTION OF THE SYSTEM AND THE METHOD

Figure 1:
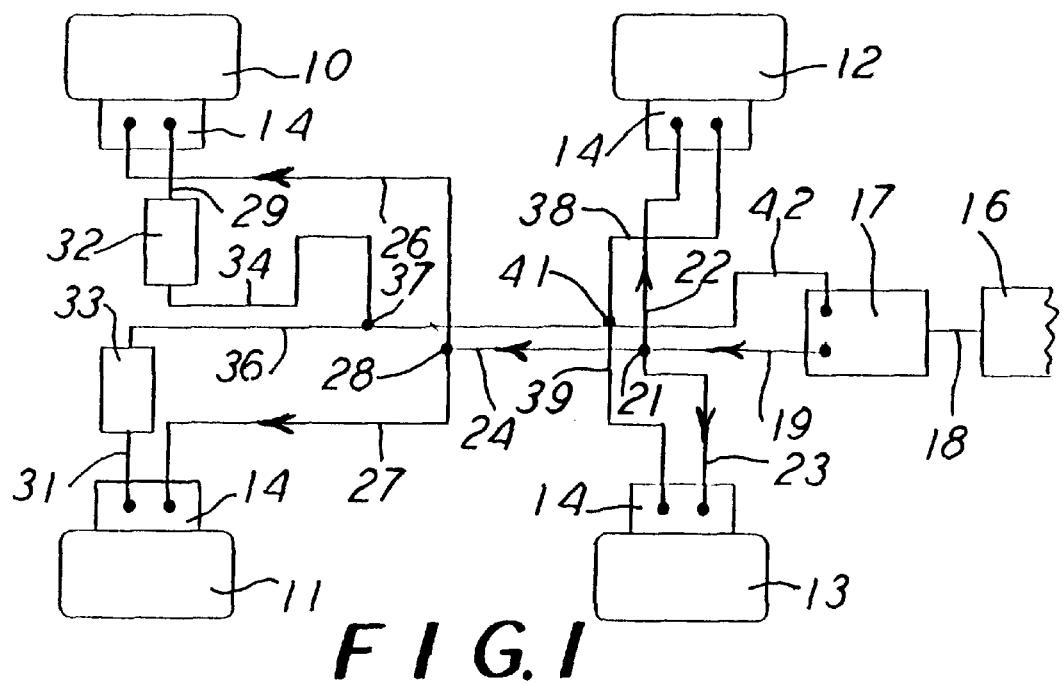
FIG. 1 is a diagrammatic view of the hydraulic system of this invention as applied to a four-wheel and four-wheel drive vehicle.

This system and method is utilized in the traction drive of a vehicle which employs at least two driving wheels and a hydraulic system for the drive. In all instances, the two driving wheels are connected in parallel relationship in the hydraulic system, and the arrangement is such that when one of the two driving wheels is frictionlessly spinning, the hydraulic power will be automatically applied to the other driving wheel. Additionally, when the spinning wheel is beyond its frictionless position and is ready to drive, then it will automatically receive its driving force so that again both the driving wheels are in operation. Also, the system applies to the forward and/or reverse drive for a vehicle. Throughout this description of the drawing diagrams, the method will inherently be disclosed also.

Throughout all of the diagrams shown as FIGS. 1 through 4, the arrow heads shown on the lines designate the high pressure line in the system, that is, the forward driving line for the forward movement of the vehicle.

FIG. 1 shows a four-wheel and four-wheel drive system with the wheels 10, 11, 12, and 13, which are of course ground-engaging wheels of a utility vehicle, tractor, or the like. Each of the four wheels has a hydraulic motor 14 conventionally coupled therewith for rotating the wheel when the hydraulic motor 14 is pressurized with the hydraulic fluid of the system.

In FIG. 1, and also in the other three figures, there is designated a conventional power source 16 which is in driving relation to a hydraulic pump 17, such as by a drive connection indicated 18. To initially trace the flow of pressurized fluid from the pump 17 and to the respective four motors 14, reference is made to a fluid line 19 extending to a connection 21 which in turn has a line 22 and a line 23 extending therefrom to the respective hydraulic motor 14. Again, the arrows on lines 19, 22, 23, show the direction of the flow of the pressurized fluid from the pump 17.

There is also a hydraulic or fluid line 24 connected with the connection 21 and extending to the two lines 26 and 27 from the common connection 28, and then the lines 26 and 27 extend to the respective hydraulic motors 14, and, again, the flow of fluid is in the direction as shown by the arrow-heads on lines 26 and 27.

In that arrangement of driving the two front wheels and the two rear wheels, as described, the two front wheels and also the rear wheels are connected in a parallel type of hydraulic connection, as shown.

The hydraulic system includes return fluid lines 29 and 31 connected to the motors 14 and connected to fuses 32 and 33 which are described later. The return flow of fluid continues through the fuses 32 and 33 and into return lines 34 and 36 connected together at 37 and also connected to lines 38 and 39 which are connected to the other two motors 14 and with all those return lines being connected at 41. Finally, a return line 42 takes the return fluid flow back to the pump 17.

With that arrangement, all four of the wheels 10, 11, 12, and 13 are driving wheels powered by the hydraulic system.

Wheels 10 and 11 can be considered to be the rear wheels and the driving or traction wheels to which the fuses 32 and 33 are connected. The arrangement is such that when the wheel 10 or 11 is frictionlessly spinning, then the fuse 32 or 33 will interrupt the flow of fluid through that wheel's motor 14, and thus the flow will be then fully applied to either of the other wheels 10 or 11 and simply be continued to be applied to the wheels 12 and 13. That is, the fuses 32 and 33 are arranged and are disposed within the system to detect a fluid pressure drop through those adjacent lines and thus close off those lines so that the pressurized and useful fluid is directed to the wheel which is not spinning. In the arrangement shown in FIG. 1, the fuses 32 and 33 are disposed on the low pressure side of the respective motors 14, but they could also be on the high pressure side.

FIG. 5 shows the longitudinal sectional view of the fuse 32 and 33, and that includes a body 43 which has a central fluid passageway 44 and an inlet end 46 and an outlet end and opening 47 so that fluid can flow through the body 43. Of course the body 43 is suitably arranged, such as with threads at 48, so that it can readily and easily be attached and even removed, from the respective lines, such as lines 29 and 34. The fuse's inlet 46 and outlet 47 are respectively connected to the lines 29 and 34 by threads at each end of 43.

Within the body 43, there is an axially movable element 49 which is under the influence of the fluid flowing through the system.

In all instances of the presence of a fuse, the fuse is of only one construction, as shown in FIG. 5, but its connection in the circuit is unique, depending on its location. Element 49 includes a cylindrically-shaped piston 51, at one end of the element 49, and a cylindrically-shaped valve closure 52, at the other end of the element 49. A snap ring 53 restricts the upward movement of the element 49 relative to the housing 43, and a compression spring 54 is disposed within the opening 44 and urges upwardly on the element 49 in the position shown in FIG. 5. The closure 52 is arranged to mate with a valve seat 56 which is circular and of a diameter of course less than the diameter of the closure 52, so that the element 49 is trapped within the body 43, but it can move from a position of contact with the seat 56 to a position of contact with the snap ring 53 and that is the position shown.

The piston end 51 has flow passageways 57 extending therethrough so that flow can reach the inner chamber 44, and that flow will continue past the closure 52 and through the outlet 47, in the normal position for the fuse 32. However, when the element 49 is subjected to the sufficient pressure differential, that is, when the vehicle wheel which is connected relative to the fuse 43 is spinning, then the fuse 32 detects the increased fluid flow therethrough and thus the increase of a pressure differential and thereby causes the element 49 to move downwardly, as it is viewed in FIG. 5, and thus have the closure 52 seat on the valve seat 56 and thereby curtail the flow through the fuse 32. That curtailment causes the hydraulic fluid to be directed to the wheel that is not spinning, as desired. Additionally, the lower end of the element 49 has a reduced fluid passageway 58 through which the fluid can still flow even though the closure 52 is in its seated position. That restricted flow condition will continue until there is a lessening of the flow through the fuse 32, that is, there is a lessening of the spinning of the wheel, and then the element 49 will respond to that lessening of the pressure differential thereacross, and the spring 54 will cause the element 49 to return to its up position and the position of full flow of fluid therethrough so that the previously spinning wheel is now energized with a full flow of hydraulic fluid.

The aforementioned description is sufficiently comprehensive so that one skilled in the art will readily understand the application of the system and method to all of the arrangements shown in FIGS. 1 through 4. Again, each arrangement has a power source 16 and a hydraulic pump 17 and the connecting lines thereto as shown.

Figure 2:
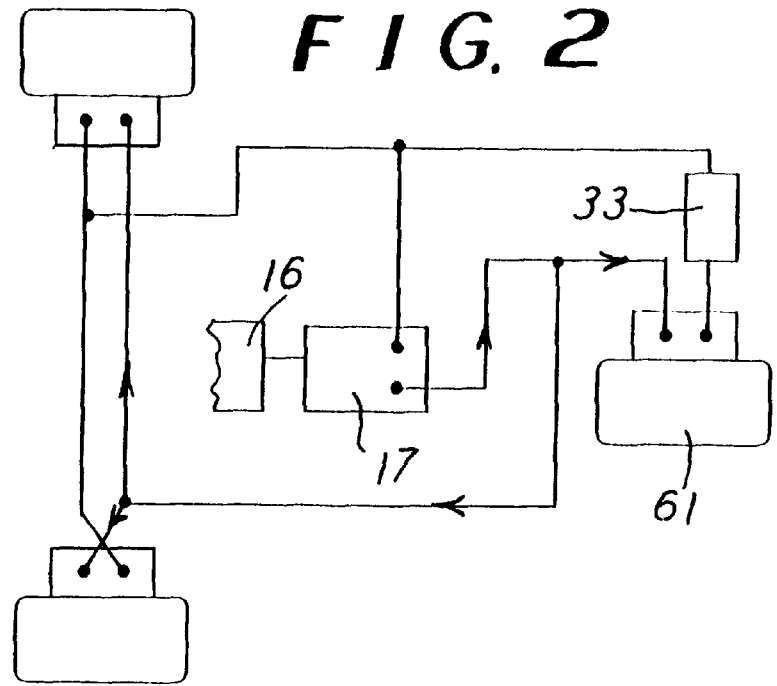
FIG. 2 is a diagrammatic view of the system as applied to a three-wheel vehicle.

FIG. 2 shows the three-wheel drive system, and if the front drive wheel 61 is spinning, then the interposed fuse 33 will sense the velocity increase of flow and thus close and permit the driving fluid to be directed to the two other wheels.

FIG. 3 shows an arrangement where the drive is on the two wheels 62 and 63 on one side of the vehicle, and, if the wheel 62 commences to spin, then the hydraulic fluid is reduced at the motor 14 for the wheel 62 and is directed to the motor 14 for the wheel 63.

FIG. 4 shows substantially the same arrangement with regard to the inclusion of the two fuses 32 and 33 for forward drive of that vehicle, but it also shows fuses 64 and 66 connected in the fluid flow pressure lines 67 and 68, so, in the forward traction drive, the fuses 64 and 66 are arranged so that full flow will go through those fuses 64 and 66 when flow is in the direction of the arrows indicated. However, if the pump 17 were to be reversed so that the vehicle would be put into reverse drive, then the flow in the lines driving the wheels 69 and 71 would correspondingly be reversed and if either wheel 69 or 71 became a spinning wheel, then the corresponding fuse 64 or 66 would close down, as previously described, so that the spinning wheel would not be receiving the free flow of fluid.

Throughout this arrangement, the method is such that two of the drive wheels of the vehicle are in parallel hydraulic connection, and the fuse is inserted in the hydraulic line to sense the increase of velocity of flow through the fuse when the wheel is spinning. Upon that action, the fuse will close down to where the pressurized fluid will be directed to the non-spinning wheel so that the vehicle can be appropriately maneuvered. This is all accomplished with the simplified and reliable and inexpensive fuse which can be readily and easily inserted in even a retrofit hydraulic system.

The fuse can be positioned either on the low pressure or high pressure side of the motor 14, understanding, of course, that the alignment is such that the fluid high pressure enters the fuse at its inlet.

With this invention, the problem of a spinning wheel is easily and reliably solved by the use of a fuse which requires only four parts itself, and which does not even require a valve seat and closure that relate in a fluid-tight manner. That is, fluid tightness is not even required in the fuse. Only one embodiment of the fuse is required throughout the several locations of the fuses. Also, a control valve of the well-known and usual type would be inserted into the system between the pump and lines described herein.

What is claimed is:

1. In a hydraulic system for use in traction drive of vehicle wheels and controlling the flow of fluid when there is loss of traction at a vehicle wheel, the improvement comprising:

a hydraulic pump, a first fluid-flow line and a second fluid-flow line with said lines separately fluid-flow connected to said pump for the flow of fluid to and from said pump, two hydraulic motors, a first set of two fluid-flow connections respectively fluid-flow connected with said first and said second lines and with said motors, and a second set of two fluid-flow connections respectively fluid-flow connected with said first and said second lines and with said motors, so as to have said first and said second set of said connections connected in parallel fluid-flow relation to said motors, a fluid-flow operative fuse being fluid-flow connected to each respective one of said connections in said first one of said sets and respectively being in series connection with a respective one of said motors, said fuses each having two fluid-flow passageways of two different large and small sizes and with said fuses being arranged to shift said small size of said passageways into operative position of fluid-flow control through said fuse and to do so automatically in response to an increase of fluid flow through said fuse caused by a condition inducing frictionless spinning of one of the vehicle wheels, said large size of said fluid flow passageways extending in only one direction and directly through said fuse, said small size of said passageway being of a fluid-flow capacity to allow a sufficient quantity of pressurized fluid to pass therethrough to said motor to have said motor create a fluid pressure that is imposed upon said fuse to cause said small passageway to shift away from the position of control when the vehicle wheel is no longer spinning, the system being arranged to have the flow of fluid be in a direction downstream from said pump to said motor, said fuse includes a shiftable element arranged for shifting of said element in a direction only along the stream of the flow of fluid and to have said element connected in the system in the position of having said small size passageway operatively ineffective when shifted away from the downstream direction of flow of fluid, a spring operative on said element and being arranged to yielding urge said element against shifting toward said downstream direction of flow of fluid and thereby releasably hold said element in a position for fluid flow which is free of control by said small passageway, and said spring being of a capacity to exert a force on said element, and the force created by the flow of fluid through said fuse under said condition of frictionless spinning of the vehicle wheel, being of respective magnitudes such that said spring force overcomes the force of the downstream flow of fluid and thereby causes said element to be shifted away from the downstream direction of the flow of the fluid, and said fuse is arranged to thereby position said small size passageway in its effective fluid-flow position of controlling the flow of fluid through said fuse.

2. The hydraulic system for the mobilization of a vehicle as claimed in claim 1, including an additional fuse fluid-flow connected to each respective one of said connections in said second one of said sets and respectively being in series connection with said motors for the control of the flow of fluid through said motors when said wheel which is connected with one of said motors is spinning in a reverse direction of drive of said vehicle.

\* \* \* \* \*